United States Patent
Hosono

(10) Patent No.: US 8,547,934 B2
(45) Date of Patent: Oct. 1, 2013

(54) RADIO COMMUNICATION METHOD, RADIO CONTROLLER, NETWORK DEVICE, RADIO BASE STATION AND CONCENTRATOR

(75) Inventor: Hiroyuki Hosono, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 251 days.

(21) Appl. No.: 12/996,229

(22) PCT Filed: Jun. 4, 2009

(86) PCT No.: PCT/JP2009/060276
§ 371 (c)(1),
(2), (4) Date: Feb. 16, 2011

(87) PCT Pub. No.: WO2009/148130
PCT Pub. Date: Dec. 10, 2009

(65) Prior Publication Data
US 2011/0128875 A1 Jun. 2, 2011

(30) Foreign Application Priority Data
Jun. 4, 2008 (JP) .................................. 2008-147466

(51) Int. Cl.
*H04W 4/00* (2009.01)
(52) U.S. Cl.
USPC .......................................... 370/331; 455/445
(58) Field of Classification Search
USPC .................... 370/252, 331; 455/445
See application file for complete search history.

(56) References Cited

U.S. PATENT DOCUMENTS 5,745,480 A * 4/1998 Behtash et al. ............... 370/252
2004/0246922 A1* 12/2004 Ruan et al. .................... 370/331
(Continued)

FOREIGN PATENT DOCUMENTS

| CN | 1151815 A | 6/1997 |
| JP | 2007 134841 | 5/2007 |
| JP | 2007 336461 | 12/2007 |
| WO | 2008 020536 | 2/2008 |

OTHER PUBLICATIONS

"Requirements for LTE Home eNodeBs, 3GPP TSG RAN #35", RP-070209, Orange, Telecom Italia, T-Mobile, Vodafone, Agenda Item 10-19, Discussion & Decision, Total pp. 4, (Mar. 6-9, 2007).

(Continued)

*Primary Examiner* — Sai-Ming Chan
(74) *Attorney, Agent, or Firm* — Oblon, Spivak, McClelland, Maier & Neustadt, L.L.P.

(57) ABSTRACT

A mobile communication method according to the present invention includes a step of monitoring, by a radio base station 201 connected to a user network, certain traffic in the user network, step of notifying, by the radio base station 201, a mobile communication network of communication quality information indicating that communication quality therein is not assurable when the radio base station 201 detects that the certain traffic exceeds a predetermined threshold, step of transmitting, by a mobile station 300, a communication start request which requests start of specific communication, to the mobile communication network, step of selecting, by the mobile communication network upon receipt of the communication start request, a radio base station to which the mobile station is connected at the time of performing the specific communication, the selection being made on the basis of the communication quality information, and step of starting, by the mobile station 300, the specific communication through the selected radio base station.

20 Claims, 11 Drawing Sheets

(56) References Cited

U.S. PATENT DOCUMENTS

| | | | |
|---|---|---|---|
| 2007/0167175 A1* | 7/2007 | Wong et al. | 455/456.5 |
| 2008/0076441 A1* | 3/2008 | Zhou | 455/452.2 |
| 2010/0014495 A1* | 1/2010 | Hirano | 370/338 |
| 2012/0276908 A1* | 11/2012 | Koyanagi et al. | 455/437 |

OTHER PUBLICATIONS

International Search Report issued Jun. 30, 2009 in PCT/JP2009 060276 filed Jun. 4, 2009.

Office Action issued Mar. 13, 2013 in Chinese Application No. 200980121216.0 (With English Translation).

* cited by examiner

RADIO COMMUNICATION METHOD, RADIO CONTROLLER, NETWORK DEVICE, RADIO BASE STATION AND CONCENTRATOR

TECHNICAL FIELD

The present invention relates to a mobile communication method, a radio controller, a network device, a radio base station and a concentrator.

BACKGROUND ART

Generally, in order to satisfy service quality requirements from a mobile station, a radio base station for public communications is operated as follows by a network operator in a mobile communication system.

(1) A private line is used as a line between radio base stations for public communications and a mobile telecommunications operator network, and traffic uncontrollable by the mobile telecommunications operator is not accommodated therein.

(2) Policies on priorities on data pieces flowing in the mobile telecommunications operator network are unified into one, and each of the data pieces is assigned a corresponding one of the priorities according to a service quality requirement by a user.

Note that such a radio base station, installed in a small-scale area such as a home, that is referred to as a "home radio base station (Home eNB), is assumed to be operated by being connected to a general access line, such as FTTH or ADSL, to which the user subscribes.

SUMMARY OF THE INVENTION

Meanwhile, on the communication line between the home radio base station and the mobile telecommunications operator network, traffic uncontrollable by the mobile telecommunications operator (for example, Internet traffic or the like flowing on a user LAN to which the home radio base station is connected) and traffic for the home radio base station might be merged on each other.

Note that, in the Internet traffic, it is impossible to assign the priorities as described in (2) above.

For this reason, there has been a problem that, when the Internet traffic increases, a service quality requirement by the user for specific communication might not be satisfied in the home radio base station.

Hence, the present invention has been made in view of the above problem. An object thereof is to provide a mobile communication method, a radio base station, a radio controller, a network device and a concentrator which are capable of avoiding performing specific communication through a home radio base station in a state where a service quality requirement by a user for the specific communication cannot be satisfied.

The first feature of the present invention is summarized in that a mobile communication method including step A of monitoring, by a radio base station connected to a user network, certain traffic in the user network; step B of notifying, by the radio base station, a mobile communication network of communication quality information indicating that communication quality therein is not assurable when the radio base station detects that the certain traffic exceeds a predetermined threshold; step C of transmitting, by a mobile station, a communication start request which requests start of specific communication, to the mobile communication network; step D of selecting, by the mobile communication network upon receipt of the communication start request, a radio base station to which the mobile station is connected at the time of performing the specific communication, the selection being made on the basis of the communication quality information; and step E of starting, by the mobile station, the specific communication through the selected radio base station.

In the first feature of the present invention, the mobile communication method may further includes step F of determining, by the mobile communication network, a communication type associated with the received communication start request, wherein in the step D, the mobile communication network selects a radio base station to which the mobile station is connected at the time of performing the specific communication, on the basis of the communication quality information, the determined communication type and a location of the mobile station.

In the first feature of the present invention, in the step F, the mobile communication network may determine the communication type associated with the communication start request, on the basis of destination information included in the communication start request.

In the first feature of the present invention, the mobile communication method may further include a step of acquiring a location of the mobile station by the mobile communication network on the basis of at least one of a location-registered area of the mobile station, identification information of a cell in which the mobile station is currently performing communication and location information indicating a longitude, a latitude and an altitude at which the mobile station is located.

In the first feature of the present invention, in the step D, a radio controller in the mobile communication network may select a radio base station to which the mobile station is connected at the time of performing the specific communication.

In the first feature of the present invention, in the step D, a network device in the mobile communication network may select a radio base station to which the mobile station is connected at the time of performing the specific communication.

The second feature of the present invention is summarized in that a radio base station which is connected to a user network, the radio base station includes a monitoring unit configured to monitor certain traffic in the user network, and a notification unit configured to notify a mobile communication network of communication quality information indicating that communication quality therein is not assurable when the radio base station detects that the certain traffic exceeds a predetermined threshold.

The third feature of the present invention is summarized in that a radio base station which is connected to a user network, the radio base station including a monitoring unit configured to monitor certain traffic in the user network, and a manager configured to manage communication quality information indicating that communication quality therein is not assurable when the radio base station detects that the certain traffic exceeds a predetermined threshold, a connection-target radio-base-station selection unit configured to select a radio base station to which the mobile station is connected at the time of performing specific communication, the selection being made on the basis of the communication quality information in response to a communication start request which requests start of the specific communication and is transmitted by the mobile station, and a connection-parameter notification unit configured to notify the mobile station of a connection parameter for starting communication through the radio base station selected by the connection-target radio-base-station selection unit.

In the third feature of the present invention, the connection-target radio-base-station selection unit may select a radio base station to which the mobile station is connected at the time of performing the specific communication, the selection being made on the basis of a communication type associated with the communication start request, the communication quality information and a location of the mobile station.

In the third feature of the present invention, the connection-target radio-base-station selection unit may acquire a location of the mobile station on the basis of at least one of a location-registered area of the mobile station, identification information of a cell in which the mobile station is currently performing communication and location information indicating a longitude, a latitude and an altitude at which the mobile station is located.

The fourth feature of the present invention is summarized in that a radio controller including a managing unit configured to manage communication quality information indicating that communication quality in a radio base station connected to a user network is not assurable, the communication quality information being notified, by the radio base station, when the radio base station detects that certain traffic in the user network exceeds a predetermined threshold; a connection-target radio-base-station selection unit configured to select a radio base station to which the mobile station is connected at the time of performing specific communication, the selection being made on the basis of the communication quality information in response to a communication start request which requests start of the specific communication and is transmitted by the mobile station; and a connection-parameter notification unit configured to notify the mobile station of a connection parameter for starting communication through the radio base station selected by the connection-target radio-base-station selection unit.

In the fourth feature of the present invention, the connection-target radio-base-station selection unit may select a radio base station to which the mobile station is connected at the time of performing the specific communication, the selection being made on the basis of a communication type associated with the communication start request, the communication quality information and a location of the mobile station.

In the fourth feature of the present invention, the connection-target radio-base-station selection unit may acquire a location of the mobile station on the basis of at least one of a location-registered area of the mobile station, identification information of a cell in which the mobile station is currently performing communication and location information indicating a longitude, a latitude and an altitude at which the mobile station is located.

The fifth feature of the present invention is summarized in that a network device including a managing unit configured to manage communication quality information indicating that communication quality in a radio base station connected to a user network is not assurable, the communication quality information being notified, by the radio base station, when the radio base station detects that certain traffic in the user network exceeds a predetermined threshold, a connection-target radio-base-station selection unit configured to select a radio base station to which the mobile station is connected at the time of performing specific communication, the selection being made on the basis of the communication quality information upon receipt of a communication start request which requests start of the specific communication and is transmitted by the mobile station, and a connection-parameter notification unit configured to notify the mobile station of a connection parameter for starting communication through the radio base station selected by the connection-target radio-base-station selection unit.

In the fifth feature of the present invention, the network device may further include a communication-type determination unit configured to determine a communication type associated with the communication start request, wherein the connection-target radio-base-station selection unit selects a radio base station to which the mobile station is connected at the time of performing the specific communication, the selection being made on the basis of a communication type associated with the communication start request, the communication quality information and a location of the mobile station, the communication type being determined by the communication-type determination unit.

In the fifth feature of the present invention, the connection-target radio-base-station selection unit may acquire a location of the mobile station by the mobile communication network on the basis of at least one of a location-registered area of the mobile station, identification information of a cell in which the mobile station is currently performing communication and location information indicating a longitude, a latitude and an altitude at which the mobile station is located.

The sixth feature of the present invention is summarized in that a concentrator including a manager configured to manage communication quality information indicating that communication quality in a radio base station connected to a user network is not assurable, the communication quality information being notified, by the radio base station, when the radio base station detects that certain traffic in the user network exceeds a predetermined threshold, a connection-target radio-base-station selection unit configured to select a radio base station to which the mobile station is connected at the time of performing specific communication, the selection being made on the basis of the communication quality information in response to a communication start request which requests start of the specific communication and is transmitted by the mobile station, and a connection-parameter notification unit configured to notify the mobile station of a connection parameter for starting communication through the radio base station selected by the connection-target radio-base-station selection unit.

As described above, according to the present invention, it is possible to provide a mobile communication method, a radio base station, a radio controller, a network device and a concentrator which are capable of avoiding performing specific communication through a home radio base station in a state where a service quality requirement by a user for the specific communication cannot be satisfied.

BEST MODES FOR CARRYING OUT THE INVENTION

Configuration of Mobile Communication System According to First Embodiment of the Present Invention A description is given of a configuration of a mobile communication system according to a first embodiment of the present invention by referring to FIG. 1 through FIG. 4. The mobile communication system according to this embodiment is a mobile communication system to which a W-CDMA scheme is applied.

Figure 1:
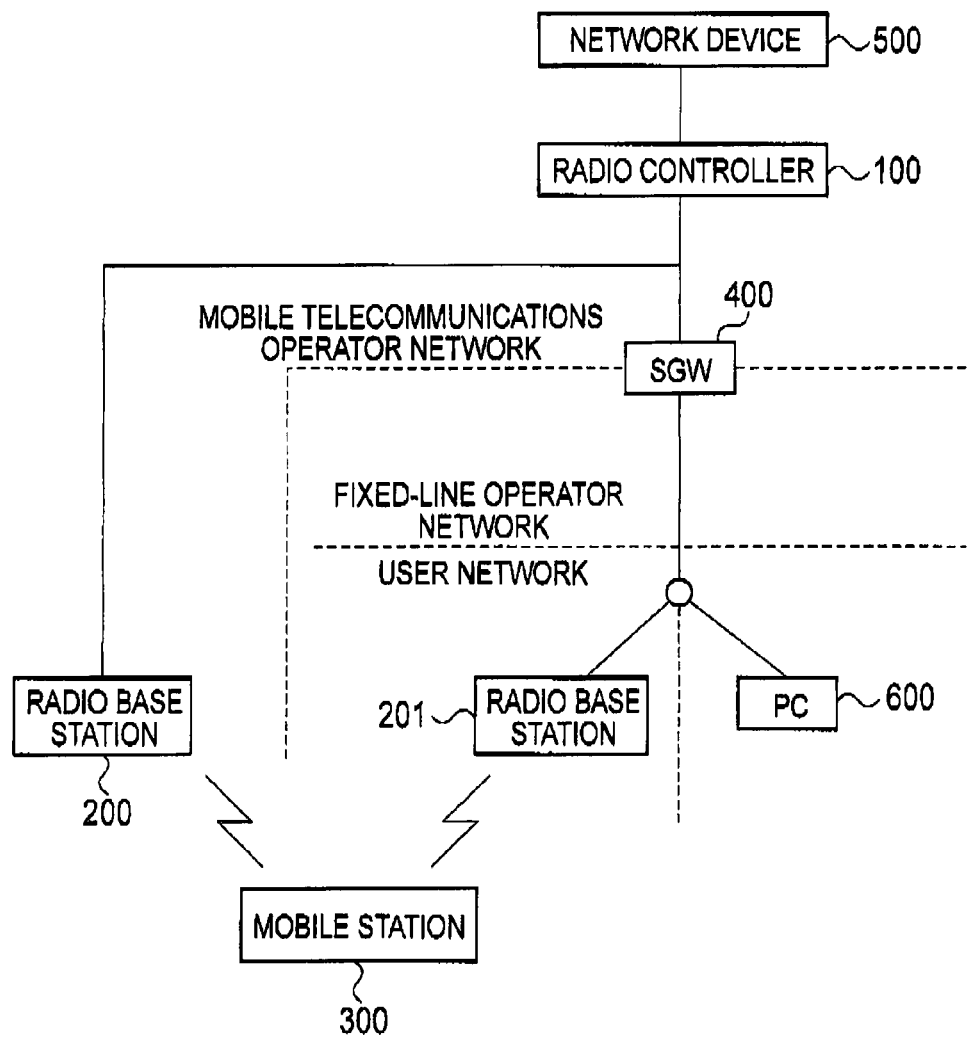
FIG. 1 is an overall configuration diagram of a mobile communication system according to a first embodiment of the present invention.

As shown in FIG. 1, the mobile communication system according to this embodiment includes a network device 500 (for example, an exchange station), a radio controller 100, a security device SGW (Security Gateway) 400 and radio base stations 200 and 201.

Note that the radio base stations 200 and 201 are covered by the radio controller 100, and the radio controller 100 is covered by the network device 500.

Specifically, the radio base station 200 is a radio base station for public communication which is installed in a mobile telecommunications operator network managed by a mobile telecommunications operator, while the radio base station 201 is a home radio base station under management of a user who subscribes to a communication service provided by the mobile telecommunications operator.

For example, the radio base station 201 is installed in a user LAN managed by the aforementioned user, and is connected to the radio controller 100 on the mobile telecommunications operator network through a fixed-line operator network formed by access lines or the like, such as FTTH and ADSL.

Note that a service quality requirement from a mobile station 300 might not be satisfied in the radio base station 201 because traffic through the radio base station 201 and Internet traffic from a PC 600 on a user network (user LAN) to which the radio base station 201 is connected are merged on each other on a single access line, the Internet traffic being uncontrollable by the mobile telecommunications operator.

Meanwhile, the SGW 400 is installed on a border of the mobile telecommunications operator network. The SGW 400 is a gateway device for protecting the mobile telecommunications operator network from an unauthorized access from other networks. The SGW 400 is configured to allow only a certain access to be made to the mobile telecommunications operator network, the certain access being authorized as a proper access by using authentication procedures.

Figure 2:
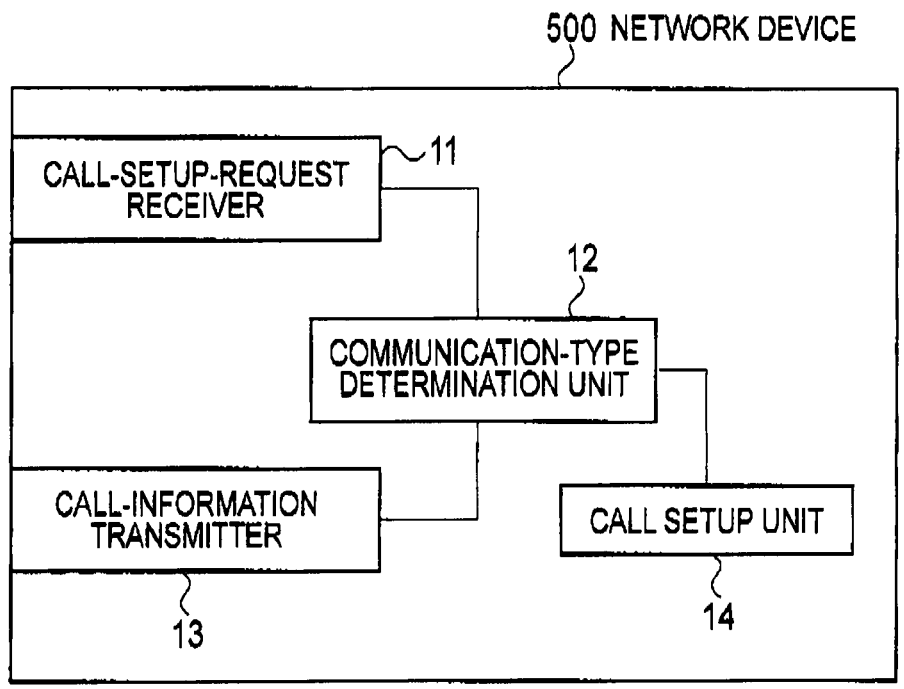
FIG. 2 is a functional block diagram of a network device according to the first embodiment of the present invention.

As shown in FIG. 2, the network device 500 includes a call-setup-request receiver 11, a communication-type determination unit 12, a call-information transmitter 13 and a call setup unit 14.

The call-setup-request receiver 11 is configured to receive a call setup request (communication start request) which requests start of specific communication, the call setup request being transmitted by the mobile station 300.

The communication-type determination unit 12 is configured to determine a communication type associated with the call setup request (communication start request) received by the call-setup-request receiver 11, that is, a type of communication requested by the call setup request (communication start request).

Specifically, the communication-type determination unit 12 may be configured to determine the communication type associated with the call setup request (communication start request) on the basis of destination information included in the call setup request (communication start request) received by the call-setup-request receiver 11.

For example, when the destination information included in the call setup request (communication start request) received by the call-setup-request receiver 11 is "Dial 110" or "Dial 119," the communication-type determination unit 12 determines that the communication type associated with the call setup request (communication start request) as "emergency communication or important communication."

The call-information transmitter 13 is configured to transmit, when the communication type associated with the call setup request (communication start request) received by the call-setup-request receiver 11 is "specific communication (for example, emergency communication)," call information indicating to that effect to the radio controller 100.

The call setup unit 14 is configured to perform, when the communication type associated with the call setup request (communication start request) received by the call-setup-request receiver 11 is other than the "specific communication (for example, emergency communication)," call setup processing in response to the call setup request (communication start request).

In addition, the radio controller 100 is configured to allocate, to the radio base stations 200 and 201, operation parameters used in radio communication between the mobile station 300 and the radio base stations 200 and 201, and to manage the operation parameters.

Figure 3:
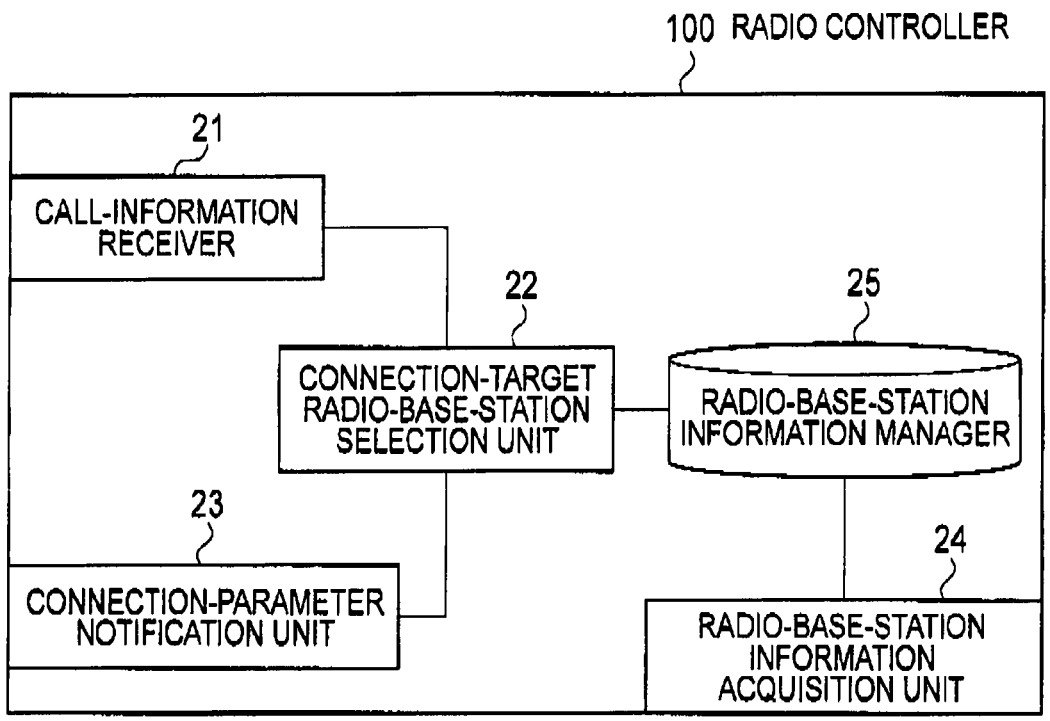
FIG. 3 is a functional block diagram of a radio controller according to the first embodiment of the present invention.

To put it concretely, as shown in FIG. 3, the radio controller 100 includes a call-information receiver 21, a connection-target radio-base-station selection unit 22, a connection-parameter notification unit 23, a radio-base-station information acquisition unit 24 and a radio-base-station information manager 25.

The call-information receiver 21 is configured to receive the aforementioned call information from the network device 500.

The radio-base-station information acquisition unit 24 is configured to acquire communication quality information notified of by any of home radio base stations (for example, the radio base station 201) connected to the user network.

Note that the communication quality information indicates whether or not communication quality can be assured in the radio base station 201.

The radio-base-station information manager 25 is configured to manage the information on the communication qualities of the home radio base stations (for example, radio base station 201) which is acquired by the radio-base-station information acquisition unit 24.

The connection-target radio-base-station selection unit 22 is configured to select a radio base station to which the mobile station 300 is connected at the time of performing "specific communication (for example, emergency communication)," the selection being made on the basis of the "communication type" notified by using the call information received by the call-information receiver 21 and a "location of the mobile station 300".

Note that the connection-target radio-base-station selection unit 22 may be configured to acquire the location of the mobile station 300 on the basis of at least one of a location-registered area of the mobile station 300, identification information of a cell in which the mobile station 300 is currently performing communication and location information (for example, GPS location information) indicating a longitude, a latitude and an altitude at which the mobile station 300 is located.

The connection-target radio-base-station selection unit 22 may be configured to select, when the aforementioned "specific communication" is "emergency communication," a radio base station determined to be highly reliable, as a radio base station to which the mobile station 300 is connected at the time of performing "specific communication," the selection being made on the basis of at least one of installation location information, a radio quality state in each of areas under control, a quality state of a backhaul line (an access line) and whether or not to be a radio base station for public communications.

In addition, the connection-target radio-base-station selection unit 22 may be configured to select a radio base station to which the mobile station 300 is connected at the time of performing "specific communication (for example, emergency communication)" on the basis of information on the communication qualities of home radio base stations, the information managed by the radio-base-station information manager 25.

The connection-parameter notification unit 23 is configured to notify the mobile station 300 of connection parameters for starting communication (for example, a spreading code, frequency information, timing and the like) through the radio base station selected by the connection-target radio-base-station selection unit 22.

Meanwhile, the radio controller 100 is configured not to receive a handover request when the handover request is transmitted to a specific radio base station by the mobile station 300 currently performing the "emergency communication" as the "specific communication" and when the specific radio base station is not determined to be highly reliable.

Figure 4:
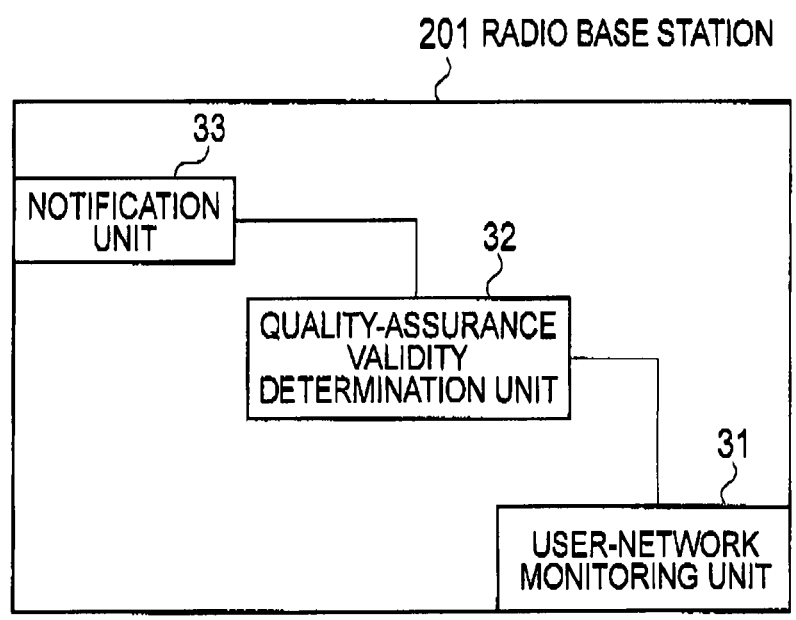
FIG. 4 is a functional block diagram of a radio base station according to the first embodiment of the present invention.

As shown in FIG. 4, the radio base station 201 includes a user-network monitoring unit 31, a quality-assurance validity determination unit 32 and a notification unit 33.

The user-network monitoring unit 31 is configured to monitor certain traffic in the user network.

Specifically, the user-network monitoring unit 31 may be configured to monitor the Internet traffic in the user network as the certain traffic.

For example, the user-network monitoring unit 31 is configured to determine, as the Internet traffic, traffic other than traffic addressed to the radio base station 201, traffic addressed to the mobile station 300 and traffic addressed to the mobile telecommunications operator network, in the user network.

The quality-assurance validity determination unit 32 is configured to determine whether or not the communication quality can be assured in the radio base station 201.

For example, when detecting that the aforementioned certain traffic exceeds a predetermined threshold, the quality-assurance validity determination unit 32 may determine that the communication quality cannot be assured.

The notification unit 33 is configured to generate communication quality information on the basis of a result of a determination by the quality-assurance validity determination unit 32 and then to notify the radio controller 100 of the communication quality information.

Note that the notification unit 33 may be configured to generate communication quality information and then to notify the radio controller 100 of the communication quality information, only when the quality-assurance validity determination unit 32 determines that the communication quality cannot be assured in the radio base station 201.

Figure 5:
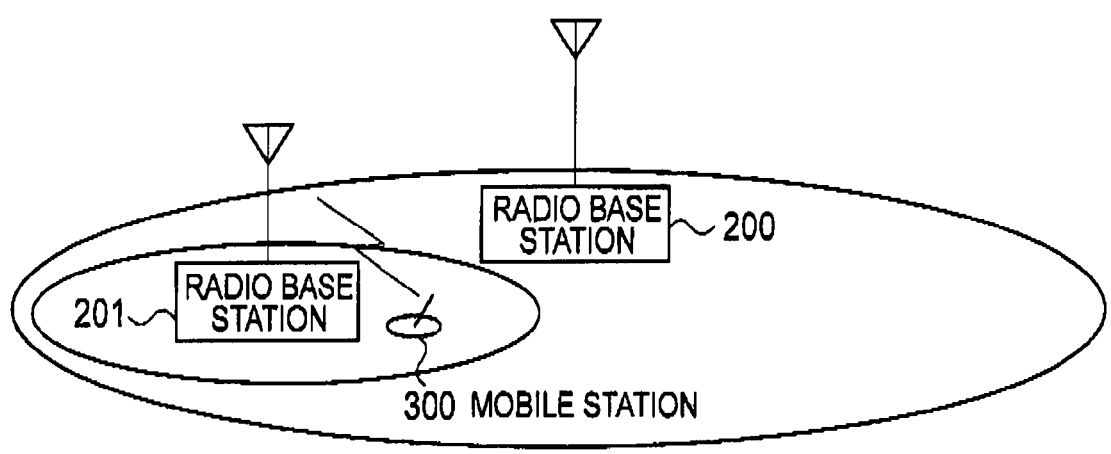
FIG. 5 is a diagram for explaining the mobile communication system according to the first embodiment of the present invention.
Figure 6:
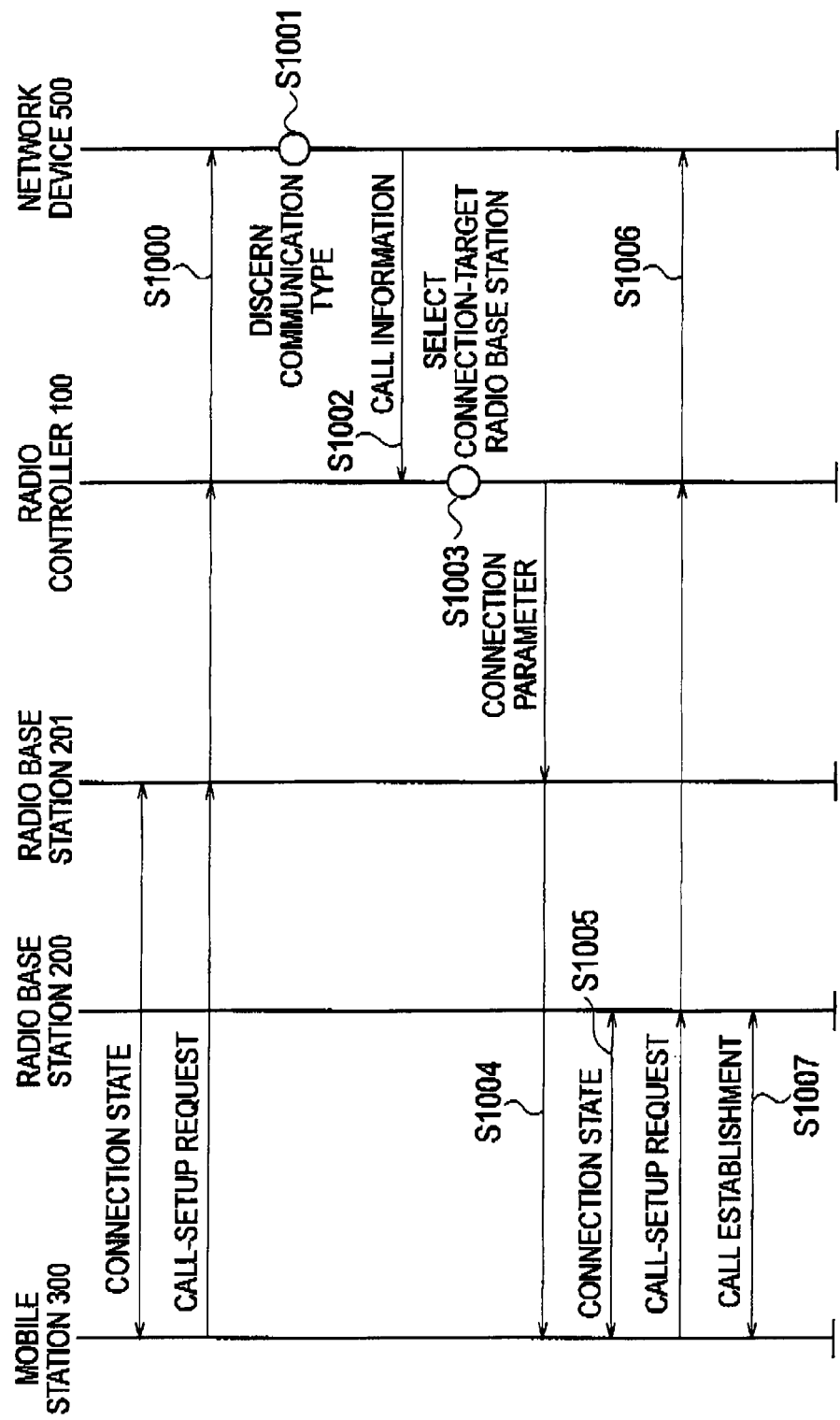
FIG. 6 is a sequence diagram showing the operation of the mobile communication system according to the first embodiment of the present invention.

Operation of Mobile Communication System According to First Embodiment of the Present Invention A description is given of an operation of the mobile communication system according to the first embodiment of the present invention by referring to FIG. 5 and FIG. 6.

Note that, as shown in FIG. 5, in this embodiment, the mobile station 300 is assumed to be connected to the radio base station 201, and in addition, an area covered by the radio base station 201 is assumed to overlap with an area covered by the radio base station 200.

In step S1000, the mobile station 300 transmits a call setup request (communication start request) which requests start of the specific communication (for example, emergency communication), to the network device 500 through the radio base station 201 and the radio controller 100.

In step S1001, the network device 500 discerns a type of communication requested by the mobile station 300 to be started, on the basis of the received call setup request (communication start request).

For example, when destination information included in the call setup request (communication start request) is "Dial 110" or "Dial 119," the network device 500 determines that the call setup request requests start of "emergency communication (important communication)."

In step S1002 after the determination, the network device 500 notifies the radio controller 100 of call information indicating the content of the call setup request (communication start request) transmitted by the mobile station 300.

In step S1003, the radio controller 100 discerns that the "specific communication" notified by using the received call information is "emergency communication (important communication)" and that the radio base station 201 connected to the mobile station 300 is a home radio base station managed by a user. In addition, as a radio base station to be newly connected to the mobile station 300, the radio controller 100 selects the radio base station 200 which is a radio base station for public communications under control of the mobile telecommunications operator network and whose coverage area overlaps with that of the radio base station 201.

Here, as the radio base station to be newly connected to the mobile station 300, the radio controller 100 may select a home radio base station in a state where the communication quality therein can be assured, on the basis of the information on communication qualities of home radio base stations.

In step S1004, the radio controller 100 notifies the mobile station 300 of connection parameters, such as a frequency, which are used by the selected radio base station 200.

In step S1005, the mobile station 300 performs connection to the radio base station 200 by using the received connection parameters. Thereafter, in step S1006, the mobile station 300 again notifies the network device 500 of a call setup request (communication start request) through the radio base station 200 and the radio controller 100.

In step S1007, the mobile station 300 establishes a call associated with the call setup request between itself and the radio base station 200, that is, starts communication associated with the call setup request.

Advantageous Effects of Mobile Communication System According to First Embodiment of Present Invention The mobile communication system according to the first embodiment of the present invention makes it possible to perform emergency communication (important communication) by using a radio base station for public communications whose communication quality can be assured, and to perform general communication by using a home radio base station whose communication quality might not be assured, thus satisfying a service quality requirement from the mobile station 300.

Figure 7:
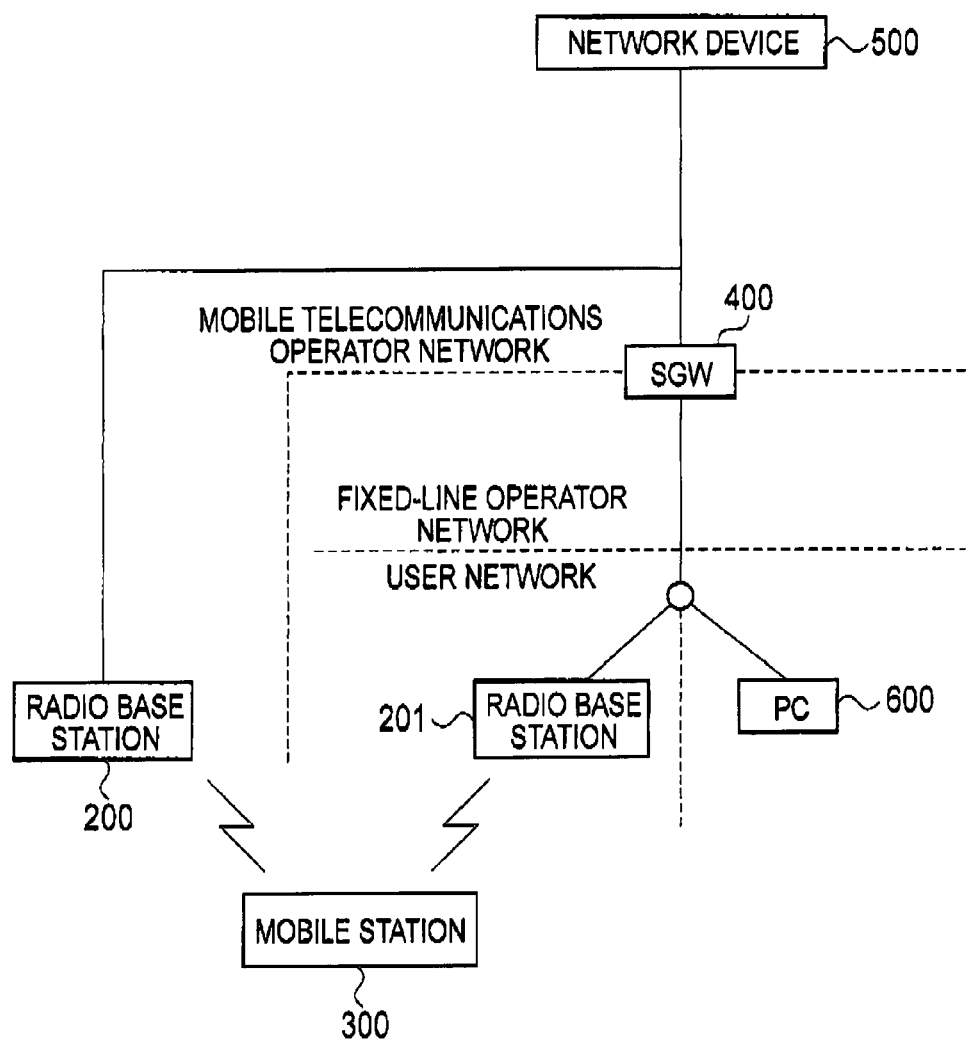
FIG. 7 is an overall configuration diagram of a mobile communication system according to a second embodiment of the present invention.
Figure 8:
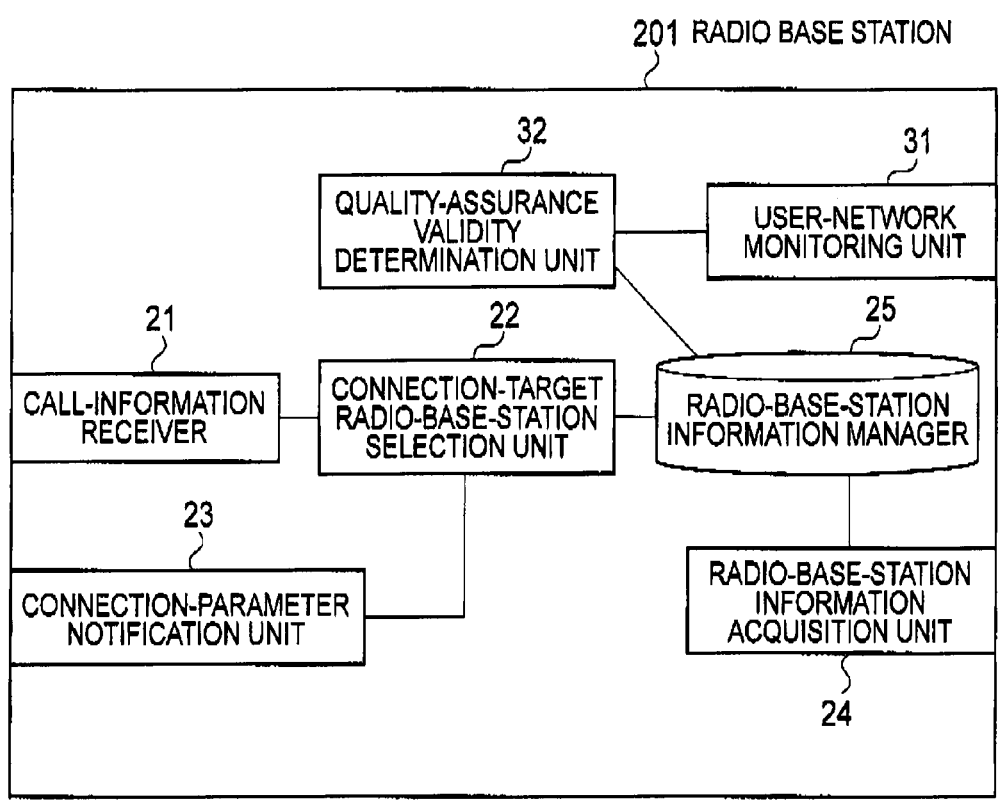
FIG. 8 is a functional block diagram of a radio base station according to the second embodiment of the present invention.
Figure 9:
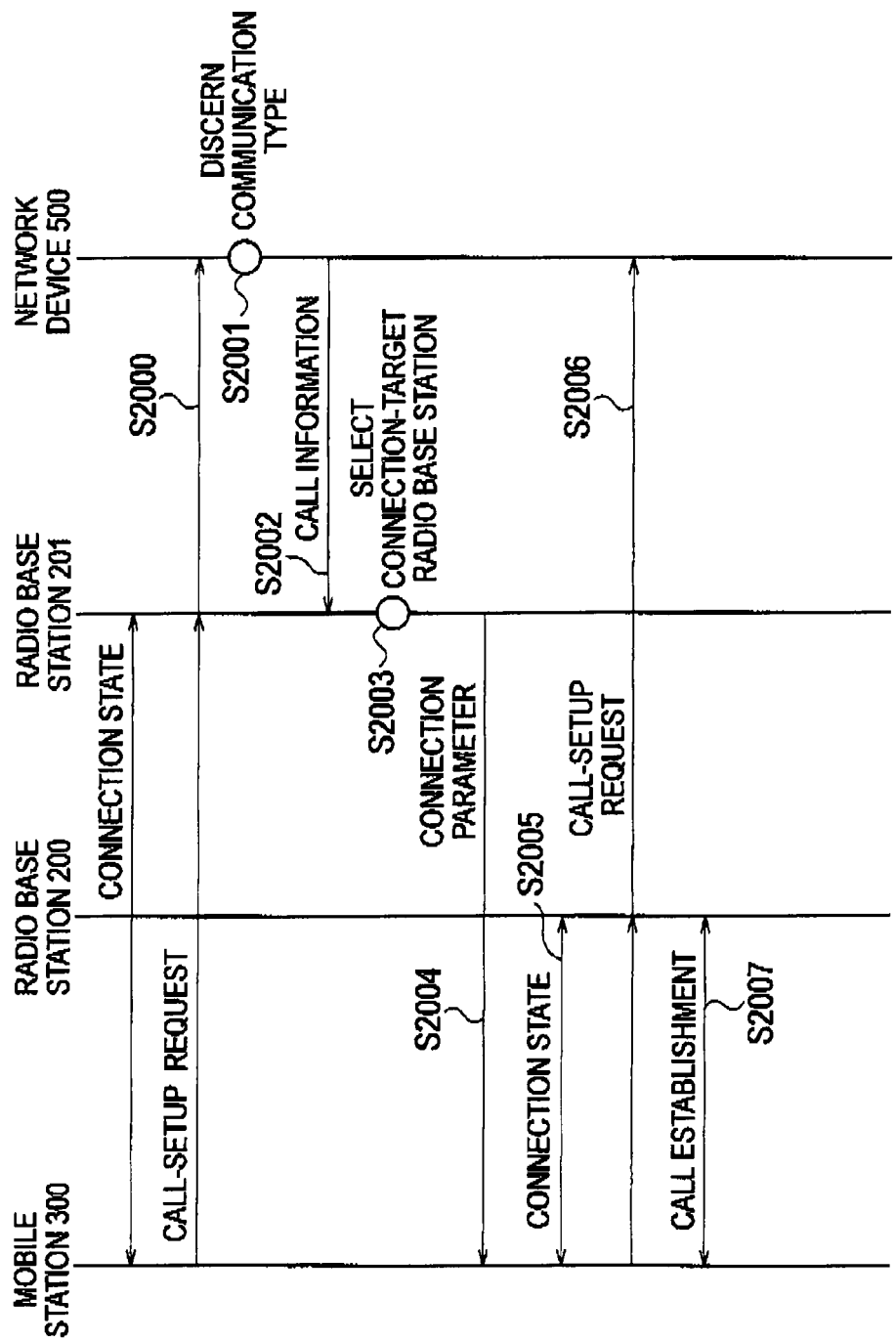
FIG. 9 is a sequence diagram showing the operation of the mobile communication system according to the second embodiment of the present invention.

Configuration of Mobile Communication System According to Second Embodiment of the Present Invention A description is given of a configuration of a mobile communication system according to a second embodiment of the present invention by referring to FIG. 7 through FIG. 9, being focused on a difference from the mobile communication system according to the aforementioned first embodiment.

The description has been given in the aforementioned first embodiment by taking the W-CDMA mobile communication system as an example. However, the present invention is not limited to such a mobile communication system, and is applicable to, for example, an LTE (Long Term Evolution) mobile communication system.

Hence, the mobile communication system according to the second embodiment of the present invention is assumed to be a mobile communication system to which an LTE scheme is applied.

In this case, functions of the aforementioned radio controller 100 are implemented on a radio base station eNB. Thus, as shown in FIG. 7, radio base stations 200 and 201 are connected to a network device 500, so that a radio access network is formed.

As shown in FIG. 8, the radio base station 201 includes a call-information receiver 21, a connection-target radio-base-station selection unit 22, a connection-parameter notification unit 23, a radio-base-station information acquisition unit 24, a radio-base-station information manager 25, a user-network monitoring unit 31 and a quality-assurance validity determination unit 32.

The call-information receiver 21 is configured to receive the aforementioned call information from the network device 500, like the call-information receiver 21 shown in FIG. 3.

The radio-base-station information acquisition unit 24 is configured to exchange control information with different home radio base stations and radio base stations for public communications and then to acquire radio base station information (for example, a coverage area and the like) on a corresponding one of the home radio base stations and the radio base stations for public communications. Specifically, the radio base station information includes the aforementioned communication quality information.

The radio-base-station information manager 25 is configured to manage the radio base station information on the home radio base stations and the radio base stations for public communications, the radio base station information being acquired by the radio-base-station information acquisition unit 24.

Like the connection-target radio-base-station selection unit 22 shown in FIG. 3, the connection-target radio-base-station selection unit 22 is configured to select a radio base station to which the mobile station 300 is connected at the time of performing "specific communication (for example, emergency communication)," the selection being made on the basis of the "communication type" notified by using the call information received by the call-information receiver 21 and a "location of the mobile station 300."

Also, like the connection-target radio-base-station selection unit 22 shown in FIG. 3, the connection-target radio-base-station selection unit 22 may be configured to select a radio base station to which the mobile station 300 is connected at the time of performing "specific communication (for example, emergency communication)," the selection being made on the basis of the communication quality information in the home radio base stations managed by the radio-base-station information manager 25.

Like the connection-parameter notification unit 23 shown in FIG. 3, the connection-parameter notification unit 23 is configured to notify the mobile station 300 of connection parameters for starting communication (for example, a spreading code, frequency information, timing and the like) through the radio base station selected by the connection-target radio-base-station selection unit 22.

Note that the user-network monitoring unit 31 and the quality-assurance validity determination unit 32 have the same functions as those of the user-network monitoring unit 31 and the quality-assurance validity determination unit 32 shown in FIG. 4.

A description is given below of an operation of the mobile communication system according to this embodiment by referring to FIG. 9.

Note that, as shown in FIG. 5, in this embodiment as in the aforementioned first embodiment, the mobile station 300 is assumed to be connected to the radio base station 201 and, in addition, an area covered by the radio base station 201 is assumed to overlap with an area covered by the radio base station 200.

In step S2000, the mobile station 300 transmits a call setup request (communication start request) which requests start of the specific communication (for example, emergency communication), to the network device 500 through the radio base station 201.

In step S2001, the network device 500 discerns a type of communication which is requested by the mobile station 300 to be started, on the basis of the received call setup request (communication start request).

For example, when destination information included in the call setup request (communication start request) is "Dial 110" or "Dial 119," the network device 500 determines that the call setup request requests start of "emergency communication (important communication)."

In step S2002 after the determination, the network device 500 notifies the radio base station 201 of call information indicating the content of the call setup request (communication start request) transmitted by the mobile station 300.

In step S2003, radio base station 201 discerns that the "specific communication" notified by using the received call information is "emergency communication (important communication)." In addition, the radio base station 201 selects, as a radio base station to be newly connected to the mobile station 300, the radio base station 200 which is a radio base station for public communications under control of the mobile telecommunications operator network and whose coverage area overlaps with that of the radio base station 201.

Here, the radio base station 201 may select, as the radio base station to be newly connected to the mobile station 300, a home radio base station in a state where the communication quality therein can be assured, on the basis of the information on communication qualities of home radio base stations.

In step S2004, the radio base station 201 notifies the mobile station 300 of connection parameters, such as a frequency, which are used by the selected radio base station 200.

In step S2005, the mobile station 300 performs connection to the radio base station 200 by using the received connection parameters. Thereafter, in step S2006, the mobile station 300 again notifies the network device 500 of a call setup request (communication start request) through the radio base station 200.

In step S2007, the mobile station 300 establishes a call associated with the call setup request between itself and the radio base station 200, that is, starts communication associated with the call setup request.

Figure 10:
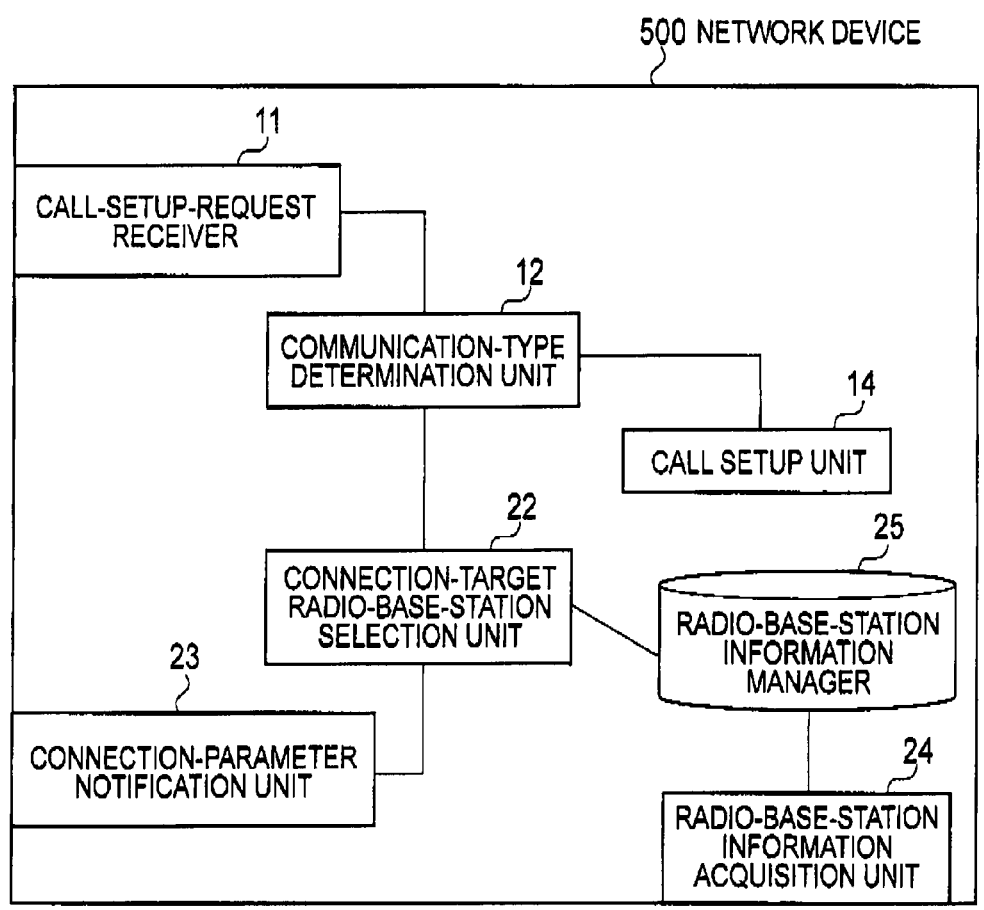
FIG. 10 is a functional block diagram of a network device according to a third embodiment of the present invention.
Figure 11:
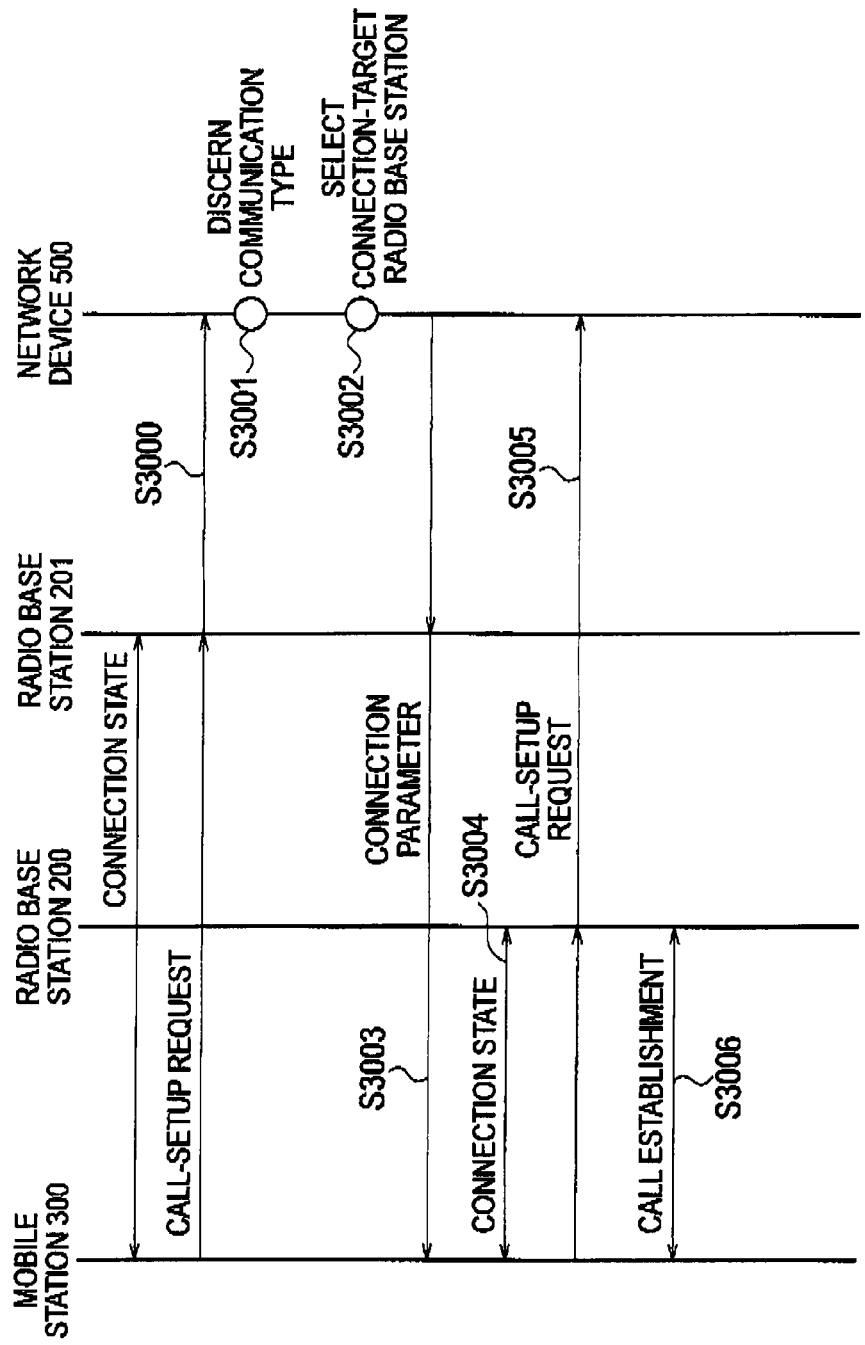
FIG. 11 is a sequence diagram showing the operation of the mobile communication system according to the third embodiment of the present invention.

Configuration of Mobile Communication System According to Third Embodiment of Present Invention A description is given of a configuration of a mobile communication system according to a third embodiment of the present invention by referring to FIG. 10 and FIG. 11, being focused on a difference from the mobile communication system according to the aforementioned first embodiment.

Note that the mobile communication system according to the third embodiment of the present invention is assumed to be a mobile communication system to which an LTE scheme is applied.

As shown in FIG. 10, the network device 500 includes a call-setup-request receiver 11, a communication-type determination unit 12, a call setup unit 14, a connection-target radio-base-station selection unit 22, a connection-parameter notification unit 23, a radio-base-station information acquisition unit 24, and a radio-base-station information manager 25.

Note that functions of the units are the same as those of the units which are included in the radio controller 100 and the network device 500 according to the aforementioned first embodiment and which are assigned the same reference numerals and names.

A description is given below of an operation of the mobile communication system according to this embodiment by referring to FIG. 11.

Note that, as shown in FIG. 5, in this embodiment as in the aforementioned first embodiment, the mobile station 300 is assumed to be connected to the radio base station 201 and, in addition, an area covered by the radio base station 201 is assumed to overlap with an area covered by the radio base station 200.

In step S3000, the mobile station 300 transmits a call setup request (communication start request) which requests start of the specific communication (for example, emergency communication), to the network device 500 through the radio base station 201.

In step S3001, the network device 500 discerns a type of communication which is requested by the mobile station 300 to be started, on the basis of the received call setup request (communication start request).

For example, when destination information included in the call setup request (communication start request) is "Dial 110" or "Dial 119," the network device 500 determines that the call setup request requests start of "emergency communication (important communication)."

In step S3002 after the determination, the network device 500 discerns that the aforementioned "specific communication" is "emergency communication (important communication)" and that the radio base station 201 connected to the mobile station 300 is a home radio base station managed by a user. In addition, as a radio base station to be newly connected to the mobile station 300, the network device 500 selects the radio base station 200 which is a radio base station for public communications under control of the mobile telecommunications operator network and whose coverage area overlaps with that of the radio base station 201.

Here, the network device 500 may select a home radio base station in a state where the communication quality therein can be assured, as the radio base station to be newly connected to the mobile station 300.

In step S3003, the network device 500 notifies the mobile station 300 of connection parameters, such as a frequency, which are used by the selected radio base station 200.

In step S3004, the mobile station 300 performs connection to the radio base station 200 by using the received connection parameters. Thereafter, in step S3005, the mobile station 300 again notifies the network device 500 of a call setup request (communication start request) through the radio base station 200.

In step S3006, the mobile station 300 establishes a call associated with the call setup request between itself and the radio base station 200, that is, starts communication associated with the call setup request.

Figure 12:
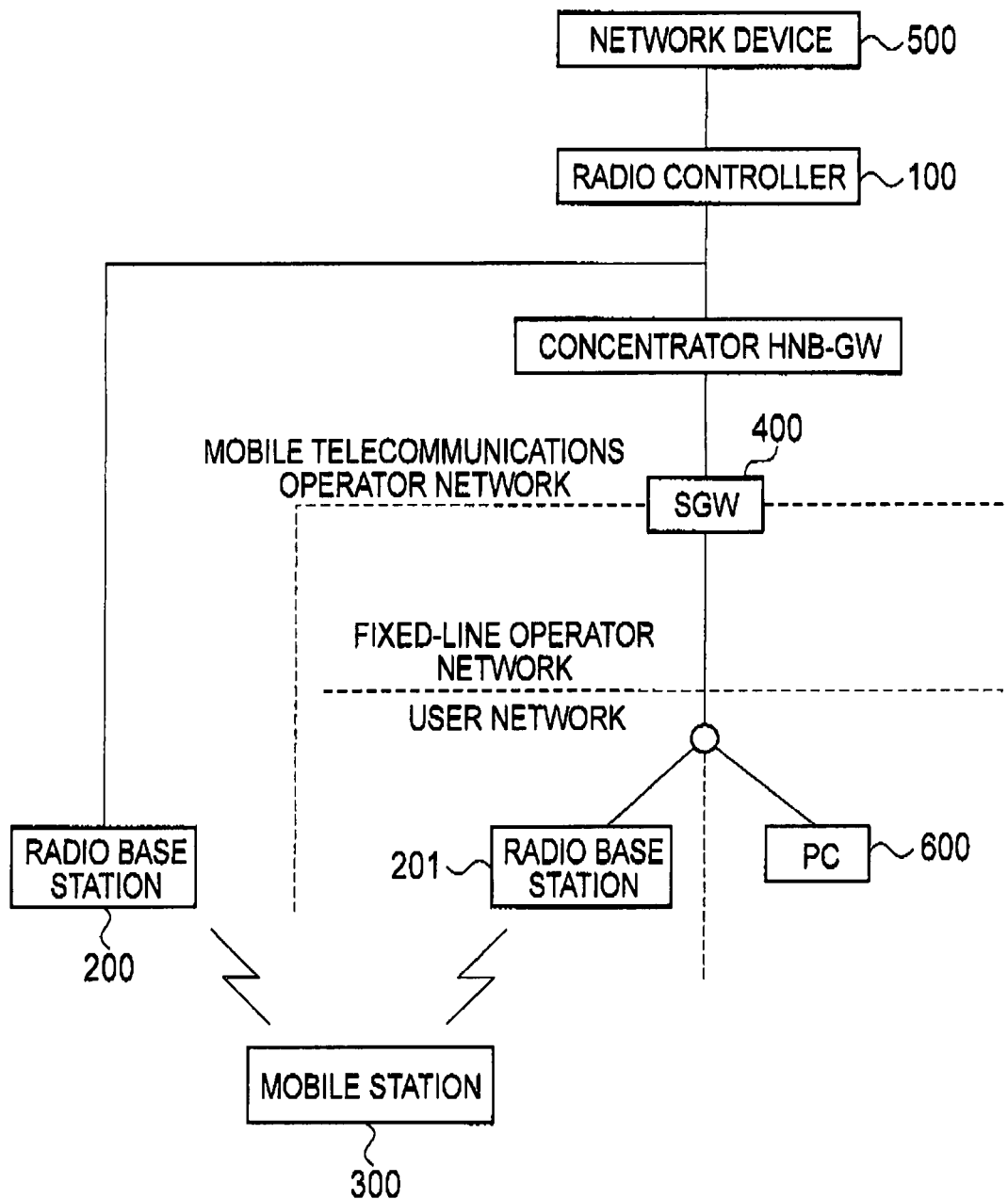
FIG. 12 is an overall configuration diagram of a mobile communication system according to a fourth embodiment of the present invention.

Configuration of Mobile Communication System According to Fourth Embodiment of Present Invention A description is given of a configuration of a mobile communication system according to a fourth embodiment of the present invention by referring to FIG. 12, being focused on a difference from the mobile communication system according to the aforementioned first embodiment.

As shown in FIG. 12, the mobile communication system according to this embodiment is provided with a concentrator HNB-GW. A radio base station 201 is covered by the concentrator HNB-GW.

Specifically, the concentrator HNB-GW is configured to include at least part of the functions (functions shown in FIG. 3) of the radio controller 100 according to the aforementioned first embodiment.

The mobile communication system according to this embodiment may be a W-CDMA mobile communication system or an LTE mobile communication system.

Configuration of Mobile Communication System According to Fifth Embodiment

Figure 13:
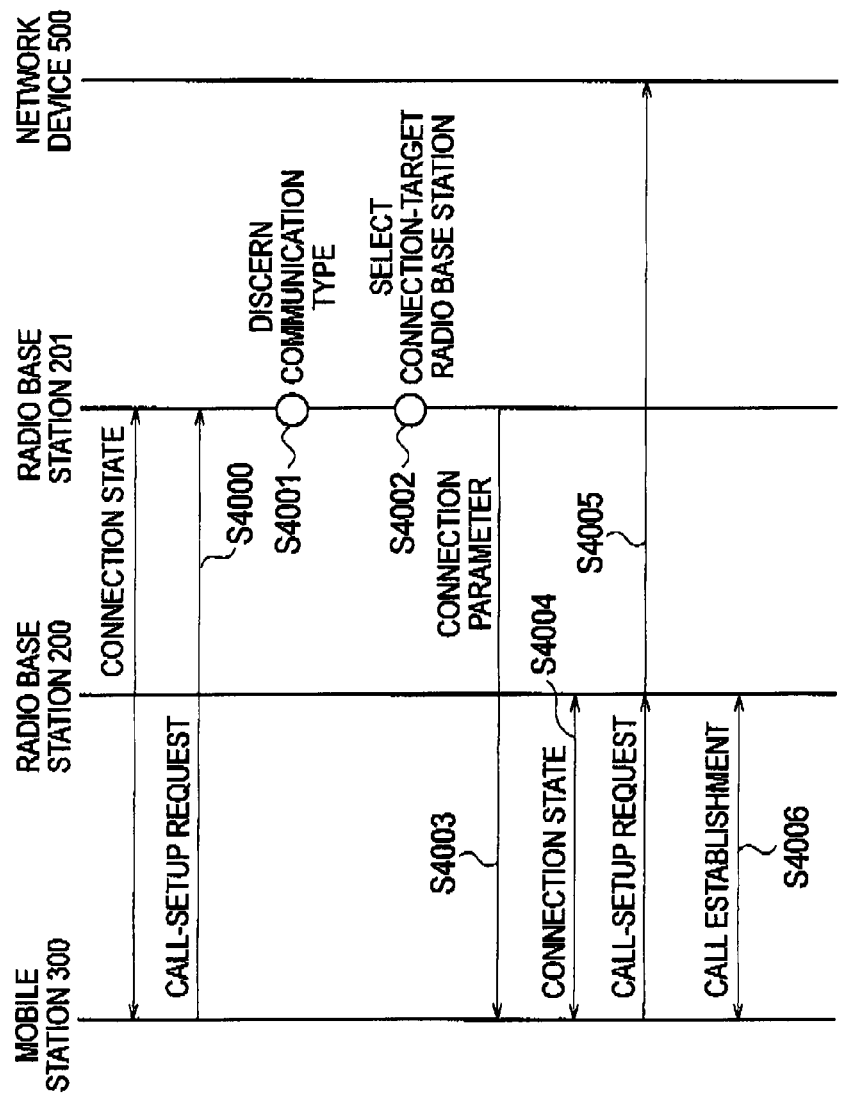
FIG. 13 is a sequence diagram showing the operation of the mobile communication system according to a fifth embodiment of the present invention.

A description is given of a mobile communication system according to a fifth embodiment of the present invention by referring to FIG. 13, being focused on a difference from the mobile communication system according to the aforementioned third embodiment.

A radio base station 201 according to this embodiment is configured to include at least part of the functions (functions shown in FIG. 10) of the network device 500 according to the aforementioned third embodiment.

A description is given below of an operation of the mobile communication system according to this embodiment by referring to FIG. 13.

Note that, as shown in FIG. 5, in this embodiment as in the aforementioned first embodiment, the mobile station 300 is assumed to be connected to the radio base station 201 and, in addition, an area covered by the radio base station 201 is assumed to overlap with an area covered by the radio base station 200.

In step S4000, the mobile station 300 transmits a call setup request (communication start request) which requests start of the specific communication (for example, emergency communication), to the radio base station 201.

In step S4001, the network device 500 discerns a type of communication which is requested by the mobile station 300 to be started, on the basis of the received call setup request (communication start request).

For example, when destination information included in the call setup request (communication start request) is "Dial 110" or "Dial 119," the radio base station 201 determines that the call setup request requests start of "emergency communication (important communication)."

In step S4002 after the determination, the radio base station 201 discerns that the aforementioned "specific communication" is "emergency communication (important communication)" and that the radio base station 201 connected to the mobile station 300 is a home radio base station managed by a user. In addition, as a radio base station to be newly connected to the mobile station 300, the network device 500 selects the radio base station 200 which is a radio base station for public communications under control of the mobile telecommunications operator network and whose coverage area overlaps with that of the radio base station 201.

Here, the radio base station 201 may select, as the radio base station to be newly connected to the mobile station 300, a home radio base station in a state where the communication quality therein can be assured, the selection being made on the basis of the information on communication qualities of home radio base stations.

In step S4003, the radio base station 201 notifies the mobile station 300 of connection parameters, such as a frequency, which are used by the selected radio base station 200.

In step S4004, the mobile station 300 performs connection to the radio base station 200 by using the received connection parameters. Thereafter, in step S4005, the mobile station 300 again notifies the network device 500 of a call setup request (communication start request) through the radio base station 200.

In step S4006, the mobile station 300 establishes a call associated with the call setup request between itself and the radio base station 200, that is, starts communication associated with the call setup request.

Incidentally, the operation of the above-mentioned radio base stations 200, 201, the radio controller 100 and the network device 500 and the concentrator HNB-GW may be implemented by means of hardware, a software module executed by a processor, or a combination of both.

The software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Moreover, the storage medium may be integrated into the processor. Additionally, the storage medium and the processor may be provided in an ASIC. The ASIC may be provided in the base stations 200, 201, the radio controller 100 and the network device 500 and the concentrator HNB-GW. Alternatively, the storage medium and the processor may be provided in the radio base stations 200, 201, the radio controller 100 and the network device 500 and the concentrator HNB-GW as a discrete component.

Hereinabove, the present invention has been described in detail using the above embodiments; however, it is apparent to those skilled in the art that the present invention is not limited to the embodiments described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising:
   step A of monitoring, by a radio base station connected to a local user network, certain traffic in the local user network;
   step B of notifying, by the radio base station, a mobile communication network of communication quality information indicating that communication quality therein is not assurable when the radio base station detects that the certain traffic in the local user network exceeds a predetermined threshold;
   step C of transmitting, by a mobile station, a communication start request which requests start of specific communication via the local user network, to the mobile communication network;
   step D of selecting, by the mobile communication network upon receipt of the communication start request, a radio base station, connected to the mobile communication network outside of the local user network, to which the mobile station is connected at the time of performing the specific communication, the selection being made on the basis of the communication quality information; and
   step E of starting, by the mobile station, the specific communication through the selected radio base station.

2. The mobile communication method according to claim 1, further comprising:
   step F of determining, by the mobile communication network, a communication type associated with the received communication start request, wherein
   in the step D, the mobile communication network selects a radio base station to which the mobile station is connected at the time of performing the specific communication, on the basis of the communication quality information, the determined communication type and a location of the mobile station.

3. The mobile communication method according to claim 2, wherein in the step F, the mobile communication network determines the communication type associated with the communication start request, on the basis of destination information included in the communication start request.

4. The mobile communication method according to claim 2, further comprising a step of acquiring a location of the mobile station by the mobile communication network on the basis of at least one of a location-registered area of the mobile station, identification information of a cell in which the mobile station is currently performing communication and location information indicating a longitude, a latitude and an altitude at which the mobile station is located.

5. The mobile communication method according to claim 1, wherein in the step D, a radio controller in the mobile communication network selects a radio base station to which the mobile station is connected at the time of performing the specific communication.

6. The mobile communication method according to claim 1, wherein in the step D, a network device in the mobile communication network selects a radio base station to which the mobile station is connected at the time of performing the specific communication.

7. A radio base station which is connected to a local user network, the radio base station comprising:
   a monitoring unit configured to monitor certain traffic in the local user network; and
   a notification unit configured to notify a mobile communication network, to which the local user network is connected, of communication quality information indicating that communication quality therein is not assurable when the radio base station detects that the certain traffic in the local user network exceeds a predetermined threshold.

8. A radio base station which is connected to a local user network, the radio base station comprising:
   a monitoring unit configured to monitor certain traffic in the local user network; and
   a managing unit configured to manage communication quality information indicating that communication quality therein is not assurable when the radio base station detects that the certain traffic in the local user network exceeds a predetermined threshold;
   a connection-target radio-base-station selection unit configured to select a radio base station, connected to a mobile communication network outside of the local user network, to which a mobile station is connected at the time of performing specific communication, the selection being made on the basis of the communication quality information in response to a communication start request which requests start of the specific communication and is transmitted by the mobile station via the local user network; and
   a connection-parameter notification unit configured to notify the mobile station of a connection parameter for starting communication through the radio base station selected by the connection-target radio-base-station selection unit.

9. The radio base station according to claim 8, wherein the connection-target radio-base-station selection unit selects a radio base station to which the mobile station is connected at the time of performing the specific communication, the selection being made on the basis of a communication type associated with the communication start request, the communication quality information and a location of the mobile station.

10. The radio base station according to claim 8, wherein the connection-target radio-base-station selection unit knows a location of the mobile station on the basis of at least one of a location-registered area of the mobile station, identification information of a cell in which the mobile station is currently performing communication and location information indicating a longitude, a latitude and an altitude at which the mobile station is located.

11. A radio controller comprising:
   a manager configured to manage communication quality information indicating that communication quality in a radio base station connected to a local user network is not assurable, the communication quality information being notified, by the radio base station, when the radio base station detects that certain traffic in the local user network exceeds a predetermined threshold;
   a connection-target radio-base-station selection unit configured to select a radio base station, connected to a mobile communication network outside of the local user network, to which a mobile station is connected at the time of performing specific communication, the selection being made on the basis of the communication quality information in response to a communication start request which requests start of the specific communication and is transmitted by the mobile station via the local user network; and
   a connection-parameter notification unit configured to notify the mobile station of a connection parameter for starting communication through the radio base station selected by the connection-target radio-base-station selection unit.

12. The radio controller according to claim 11, wherein the connection-target radio-base-station selection unit selects a radio base station to which the mobile station is connected at the time of performing the specific communication, the selection being made on the basis of a communication type associated with the communication start request, the communication quality information and a location of the mobile station.

13. The radio controller according to claim 11, wherein the connection-target radio-base-station selection unit knows a location of the mobile station on the basis of at least one of a location-registered area of the mobile station, identification information of a cell in which the mobile station is currently performing communication and location information indicating a longitude, a latitude and an altitude at which the mobile station is located.

14. A network device comprising:
   a manager configured to manage communication quality information indicating that communication quality in a radio base station connected to a local user network is not assurable, the communication quality information being notified, by the radio base station, when the radio base station detects that certain traffic in the local user network exceeds a predetermined threshold;
   a connection-target radio-base-station selection unit configured to select a radio base station, connected to a mobile communication network outside of the local user network, to which a mobile station is connected at the time of performing specific communication, the selection being made on the basis of the communication quality information upon receipt of a communication start request which requests start of the specific communication and is transmitted by the mobile station via the local user network; and
   a connection-parameter notification unit configured to notify the mobile station of a connection parameter for starting communication through the radio base station selected by the connection-target radio-base-station selection unit.

15. The network device according to claim 14, further comprising a communication-type determination unit configured to determine a communication type associated with the communication start request, wherein
   the connection-target radio-base-station selection unit selects a radio base station to which the mobile station is connected at the time of performing the specific communication, the selection being made on the basis of a communication type associated with the communication start request, the communication quality information and a location of the mobile station, the communication type being determined by the communication-type determination unit.

16. The network device according to claim 14, wherein the connection-target radio-base-station selection unit knows a location of the mobile station by the mobile communication network on the basis of at least one of a location-registered area of the mobile station, identification information of a cell in which the mobile station is currently performing communication and location information indicating a longitude, a latitude and an altitude at which the mobile station is located.

17. A concentrator comprising:
a manager configured to manage communication quality information indicating that communication quality in a radio base station connected to a local user network is not assurable, the communication quality information being notified, by the radio base station, when the radio base station detects that certain traffic in the local user network exceeds a predetermined threshold;
a connection-target radio-base-station selection unit configured to select a radio base station, connected to a mobile communication network outside of the local user network, to which a mobile station is connected at the time of performing specific communication, the selection being made on the basis of the communication quality information in response to a communication start request which requests start of the specific communication and is transmitted by the mobile station via the local user network; and
a connection-parameter notification unit configured to notify the mobile station of a connection parameter for starting communication through the radio base station selected by the connection-target radio-base-station selection unit.

18. The mobile communication method according to claim 1, wherein the selected radio base station is a radio base station for public communication installed in the mobile communication network managed by a mobile communication operator.

19. The mobile communication method according to claim 18, wherein the radio base station connected to the local user network is a home radio base station under management of a user who subscribes to a communication service provided by the mobile communication operator.

20. The mobile communication method according to claim 19, wherein the local user network is a LAN managed by the user and is connected to the mobile communication network through a fixed-line operator network.

* * * * *